United States Patent
Bacche

(10) Patent No.: US 9,247,245 B2
(45) Date of Patent: Jan. 26, 2016

(54) ADAPTIVE FILTER FOR VIDEO SIGNAL PROCESSING FOR DECODER THAT SELECTS RATE OF SWITCHING BETWEEN 2D AND 3D FILTERS FOR SEPARATION OF CHROMA AND LUMA SIGNALS

(71) Applicant: STMicroelectronics International N.V., Amsterdam (NL)

(72) Inventor: Ravi Ananthapur Bacche, Bangalore (IN)

(73) Assignee: STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 14/268,766

(22) Filed: May 2, 2014

(65) Prior Publication Data
US 2014/0241416 A1    Aug. 28, 2014

Related U.S. Application Data

(62) Division of application No. 12/857,381, filed on Aug. 16, 2010, now Pat. No. 8,731,072.

(30) Foreign Application Priority Data

Jun. 7, 2010    (IN) .......................... 1319/DEL/2010

(51) Int. Cl.
*H04N 19/139*    (2014.01)
*H04N 9/78*    (2006.01)
*H04N 19/597*    (2014.01)
*H04N 19/117*    (2014.01)
*H04N 19/182*    (2014.01)

(52) U.S. Cl.
CPC ........... *H04N 19/00151* (2013.01); *H04N 9/78* (2013.01); *H04N 19/117* (2014.11); *H04N 19/139* (2014.11); *H04N 19/182* (2014.11); *H04N 19/597* (2014.11)

(58) Field of Classification Search
CPC ..... H04N 9/78; H04N 19/182; H04N 19/139; H04N 19/117; H04N 19/597
USPC ............. 375/240.29; 348/663, 666, 667, 668, 348/669
See application file for complete search history.

(56) References Cited

U.S. PATENT DOCUMENTS

| | | | |
|---|---|---|---|
| 4,617,589 A | 10/1986 | Weckenbrock | |
| 5,130,798 A * | 7/1992 | Christopher | H04N 7/012 348/620 |
| 5,166,788 A | 11/1992 | Lee | |
| 5,260,775 A * | 11/1993 | Farouda | 348/619 |
| 5,412,436 A * | 5/1995 | Christopher | 348/700 |
| 5,596,418 A * | 1/1997 | Strolle et al. | 386/304 |
| 6,384,873 B1 * | 5/2002 | Rumreich et al. | 348/666 |
| 7,271,850 B2 * | 9/2007 | Chao | 348/609 |
| 7,535,515 B2 | 5/2009 | Bacche | |
| 7,710,502 B2 * | 5/2010 | Chan et al. | 348/668 |

(Continued)

*Primary Examiner* — Jay Patel
*Assistant Examiner* — Francis G Geroleo
(74) *Attorney, Agent, or Firm* — Gardere Wynne Sewell LLP

(57) ABSTRACT

An adaptive temporal motion filter for a video decoder system operates in an infinite impulse response (IIR), a max or a bypass mode. The adaptive temporal motion filter includes an adaptive time constant control module and a filter gain module. A gain factor of the filter gain module is varied by the adaptive time constant control module for every pixel in a current composite video signal. The adaptive time constant control module selects a variable gain for the filter gain module based on the motion magnitude, motion polarity and chroma luma status of the pixel.

17 Claims, 8 Drawing Sheets

(56) References Cited

U.S. PATENT DOCUMENTS

| | | |
|---|---|---|
| 8,174,544 B2 | 5/2012 | Sato |
| 2005/0134742 A1* | 6/2005 | Shan et al. .................... 348/669 |
| 2005/0134745 A1* | 6/2005 | Bacche et al. ................ 348/702 |
| 2009/0161770 A1 | 6/2009 | Dong |
| 2011/0075042 A1* | 3/2011 | Wang et al. ................... 348/669 |

* cited by examiner

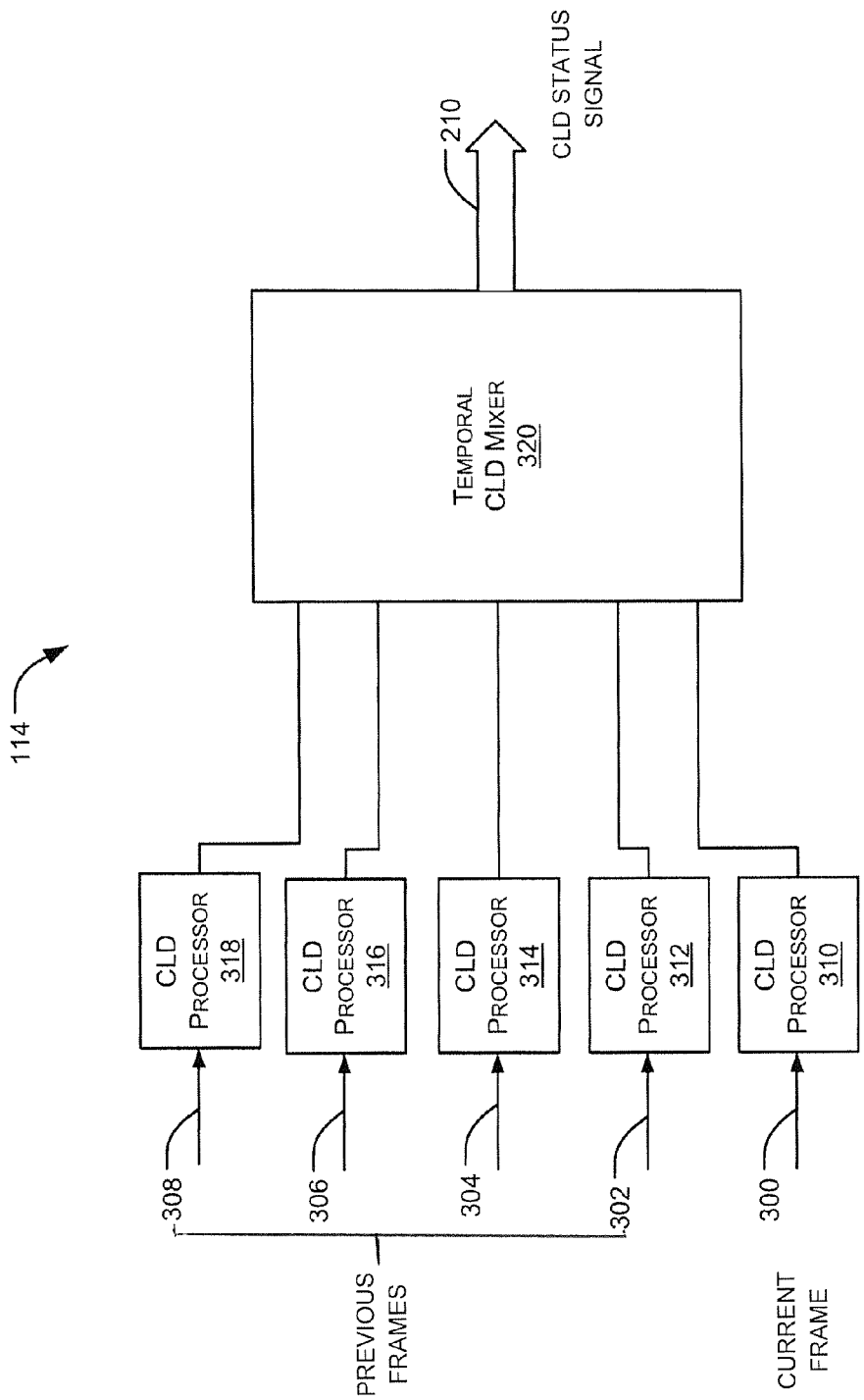

ADAPTIVE FILTER FOR VIDEO SIGNAL PROCESSING FOR DECODER THAT SELECTS RATE OF SWITCHING BETWEEN 2D AND 3D FILTERS FOR SEPARATION OF CHROMA AND LUMA SIGNALS

RELATED APPLICATION

The present application is a divisional of and claims priority of U.S. patent application Ser. No. 12/857,381 filed Aug. 16, 2010, which claims benefit of India Patent Application No. 1319/DEL/2010 filed Jun. 7, 2010, both of which are incorporated herein in their entirety by this reference.

FIELD OF INVENTION

The present subject matter, in general, relates to signal processing and, in particular, relates to processing of a composite video signal in a video decoder.

BACKGROUND

Video images are a more effective means of communication when compared to still images. Various electronic devices such as televisions and video record players that display video images have become very common household devices.

A television (TV), for example, operates by displaying video images in response to composite video signals received from a TV station or a video recorder attached to the television. A composite video signal comprises a luma signal and a chroma signal. The luma signal contains the luminance information, i.e., the grayscale or brightness details, pertaining to the video images. The chroma signal, on the other hand, contains chrominance information pertaining to the color details of the video images.

During encoding of the composite video signals for transmission purposes, the chroma signal is modulated into a subcarrier signal and is mixed with the luma signal to limit the transmission bandwidth of the composite video signals. Thus, the chroma and the luma signals may partially share the same range of frequencies. When received by the TV, the composite video signal is input to a video decoder, which separates the chroma and the luma signals and performs a series of signal processing operations to display the video images.

In general, the quality of separation of the chroma and luma signal of the composite video signals determines the quality of the video images displayed. In other words, to display high-quality video images, absolute separation of the chroma and the luma signals is required. However, this requirement is difficult to be fulfilled since some luma signals have frequencies that fall near the chroma subcarrier frequency and thus may not be separated by the video decoder.

Incomplete separation of the chroma and luma signals results in cross-luminance or cross-chrominance effects.

To prevent cross-luminance or cross-chrominance effects, video decoders employ sophisticated filters to enhance the separation of the chroma and the luma signals. Different types of filters, such as notch filters and comb filter, are used for that purpose. Comb filters are known to display a superior performance amongst the various other available filters.

Comb filters basically utilize two techniques for separation of the chroma and the luma signals: line combing and frame combing. Line combing is generally utilized to display those portions of the video images that undergo motion while frame combing is applied to the portions that are still. Depending on the detection of motion in a video image to be displayed, a switching operation, i.e., dynamic switching between a line filter and a frame filter of the video decoder, may be performed for every pixel of the image.

SUMMARY

The subject matter described herein is directed towards an adaptive filter for video signal processing for use in a video decoder system. This summary is not intended to identify essential features of the claimed subject matter, nor is it intended for use in determining the scope of the claimed subject matter.

The adaptive filter, interchangeably referred to as the temporal adaptive motion filter, includes an adaptive time constant control module. In one implementation, the adaptive time constant control module receives details relating to a motion magnitude, a motion polarity, and a chroma-luma status of pixels in of a current composite video signal. A pixel may be decoded using a 2D filtering method and or a 3D filtering method. Based on the motion magnitude, the motion polarity, and the chroma-luma status of a pixel, the adaptive time constant control module selects a time constant to vary a rate of transition between the 2D filtering method and the 3D filtering method.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

FIG. 3 illustrates an exemplary chroma-luma detection (CLD) module of the adaptive temporal motion filter, according to an embodiment of the present subject matter.

DETAILED DESCRIPTION OF PREFERRED EMBODIMENTS

Figure 1:
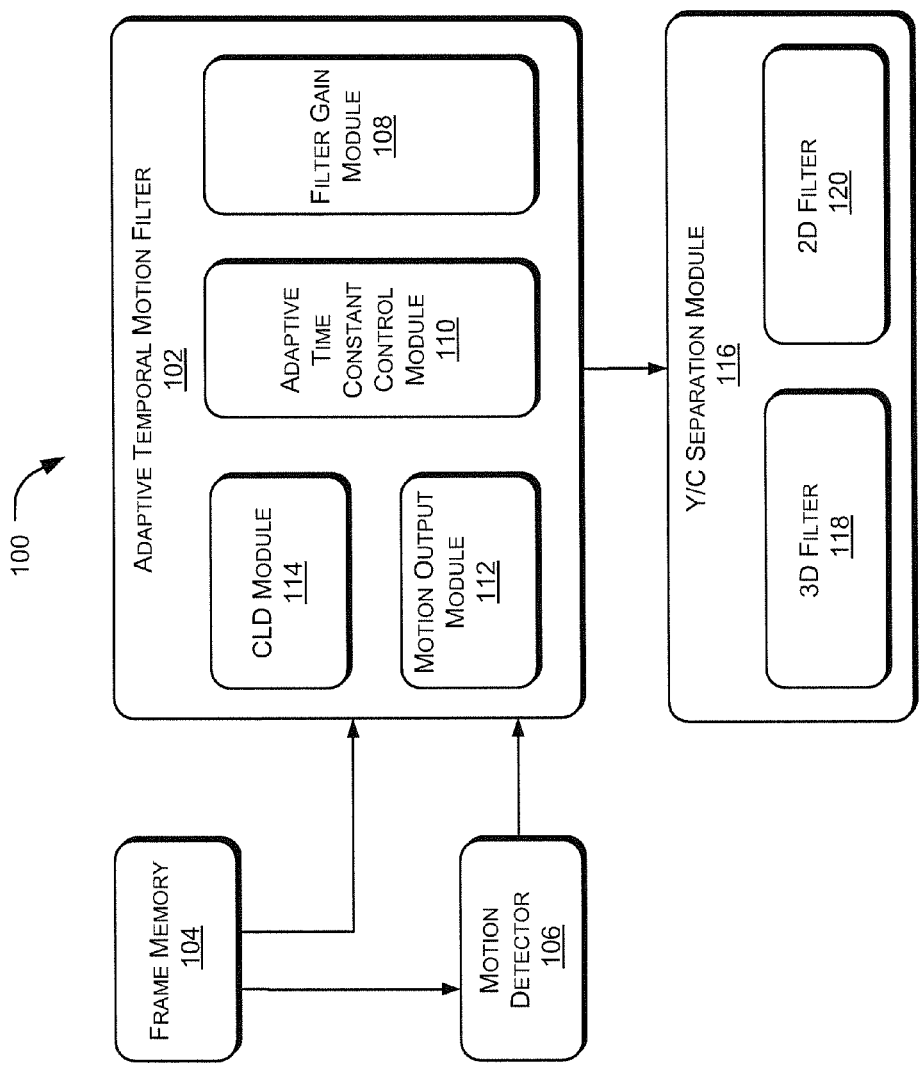
FIG. 1 illustrates a block diagram of an exemplary video decoder system, in accordance with an embodiment of the present subject matter.

Conventionally, comb filtering methods are predominantly used in composite video signal decoding for the separation of a chrominance (chroma) and a luminance (luma) signal from a composite video signal, also referred to as signal.

There are two major types of comb filtering, namely, line combing and frame combing. In the National Television System Committee (NTSC) system the line combing method exploits the fact that the phase of a subcarrier, onto which the chroma signal is modulated, is designed to reverse by 180 degrees between two adjacent lines of a field of a video image. The frame combing method, on the other hand, operates on the principle that the phase of the subcarrier between two lines having the same position in two adjacent frames of the image also reverses in NTSC system.

Basically, both the methods involve adding or subtracting two identical composite video signals, both having the chroma signal phase reversed by 180 degrees with respect to one another. On adding these two composite video signals, the chroma signals are canceled out and the luma signal is output. On subtracting the two composite video signals, however, the luma information is lost and the chroma signal is the output.

Both the methods may be employed for NTSC system as well as Phase Alternate Line (PAL) system. This description is directed towards the NTSC system. However, it will be appreciated that the principle explained herein may be extended to the PAL system with modifications that will be apparent to one skilled in the art.

When line combing is employed in NTSC system, nearest lines of the image belonging to one field and having the subcarrier 180° out of phase are used. For that purpose, two or more lines may be utilized. For example, when two lines are used, one of the lines is delayed by storing in a memory component and the delayed line is subtracted with a current line. Since the chroma subcarriers of the adjacent lines are 180° degrees out of phase with each other, the chroma signal is separated and the luma signal is cancelled as a result of the subtraction.

When three lines are used, a correlation or a degree of similarity in the picture information contained in the three lines is determined between lines 1 and 2, and lines 2 and 3, respectively, and the filtering is performed on the two lines that have the best correlation. This is often referred to as a 2D adaptive line combing.

When frame combing is used in NTSC system, two lines that occupy the same position in two adjacent frames are used as opposed to two adjacent lines within a single field, thereby extending the filtering into the temporal domain. Accordingly, frame combing is referred to as temporal filtering, while line combing is often called spatial filtering.

To perform frame combing a certain amount of correlation between the two lines of the two adjacent frames is necessary. In other words, frame combing can only be performed for still portions of an image. If motion is present, line combing is required to be performed.

Consequently, it becomes important to determine motion between images in any two adjacent frames. The method of using motion detection to change comb filtering from frame combing to line combing is referred to as motion adaptive decoding, or 3D adaptive decoding.

In the 3D adaptive decoding, the filtering method utilized is switched between the 2D adaptive line combing and the frame combing, on a pixel-by-pixel basis. The 2D adaptive line combing is hereinafter referred to as 2D filtering while the frame combing is referred to as 3D filtering. If no motion is present, then 3D filtering is applied, and if motion is present, then 2D filtering is applied.

However, in switching between the 2D and the 3D filtering various switching artifacts, such as cross-luminance, cross-chrominance, luma flashes, or large area cross-luminance dot crawls are often observed on a display device displaying the video images contained in the signals. The various reasons for these switching artifacts are the chroma-luma separation quality difference between 2D and 3D filtering, inaccurate detection of presence of motion in image signals in the composite video signals, and so on.

To this end, disclosed herein is an adaptive temporal motion filter in a video decoder system for video signal processing of composite video signals by selectively allowing 3D or 2D filtering. In particular, the subject matter relates to an adaptive temporal motion filter to enable adaptive soft switching between a 3D filter and a 2D filter of the video decoder system, on a per pixel basis, thus allowing an appropriate decoding of an incoming composite video signal and display of video images on the display device. The adaptive soft switching prevents occurrences of flash and motion artifacts, like cross-luminance artifacts, in the displayed video image.

Further, the adaptive temporal motion filter enables automatic mode selection between an adaptive IIR mode, a max mode, and a bypass mode, thereby providing a smoother mode switching response and reduced switching artifacts for the video decoding process. Accordingly, the video decoder system may be implemented for video signal processing in high end display devices, which demand a smoother mode switching response. For example, the video decoder system may be implemented in a variety of electronic devices, for example, plasma (TV), liquid crystal display (LCD) TV, digital video disc (DVD) players and recorders, set-top boxes (STB), video game consoles and so on. Also, the video decoder system may be implemented for video signal processing in both PAL and NTSC systems.

FIG. 1 illustrates a block diagram of an exemplary video decoder system 100 for video signal processing, in accordance with an embodiment of the present subject matter. The video decoder system 100 includes an adaptive temporal motion filter 102, which is hereinafter referred to as adaptive filter 102, a frame memory 104, and a motion detector 106.

In one embodiment, the frame memory 104 stores incoming composite video (CVBS) signals and adds requisite delays to the same to generate corresponding delayed CVBS signals. The motion detector 106 receives the CVBS signals from the frame memory 104 and compares a current CVBS signal with the one or more corresponding delayed CVBS signals to detect the presence of motion in the current CVBS signal. The motion detector 106, may operate in a manner known to a person skilled in the art. The presence or absence of motion in every pixel of the current CVBS signal is determined by the motion detector 106 and is communicated to the adaptive filter 102.

If motion is present, 2D filtering is used to decode the pixel. On the other hand, 3D filtering may be used if motion is absent. Based on the type of filtering required, a switching action is performed between a 3D filter 118, which carries out the 3D filtering, and a 2D filter 120, which carries out the 2D filtering. Both the 2D filter 120 and the 3D filter 118 are part of the video decoder system 100.

In one implementation, the switching action may be such that a transition from the 2D filter 120 to the 3D filter 118 is slower as compared to the transition from the 3D filter 118 to the 2D filter. In addition, the rate of switching between the 3D and 2D filters is adaptive and may be varied. Such an adaptive switching is herein referred to as adaptive soft switching.

In one implementation, the adaptive soft switching is based on factors such as motion magnitude, motion polarity as well as image heuristics, such as chroma-luma status of the pixels of the current CVBS. The adaptive soft switching is enabled by adaptively varying a time constant of the adaptive filter 102. To vary the time constant, a gain factor of a filter gain module 108 of the adaptive filter 102 is selectively changed, based on one or more of the motion magnitude, the motion polarity, and the chroma-luma status of pixels. The filter gain module 108 is configured to perform a transition between from the 2D filter 120 to the 3D filter 118 at a rate governed by the time constant.

For the purpose of varying the time constant of the adaptive filter 102, an adaptive time constant control (TCC) module 110 is associated with the filter gain module 108. The adaptive TCC module 110 receives the motion magnitude and motion polarity information from a motion output module 112 and the chroma-luma status from a chroma-luma detection (CLD) module 114.

In operation, the motion output module 112 determines the motion magnitude and the motion polarity of the pixels by comparing a current motion and a delayed motion, wherein, generally speaking, the current motion is generated by the motion detector 106 based on the current and delayed CVBS signals, while the delayed motion is obtained by delaying a filter output motion generated by the adaptive filter 102. The CLD module 114 determines the chroma-luma status of the pixels by performing temporal filtering of the chroma-luma status of the pixels using a current and a delayed chroma-luma status signals that are derived from the current and delayed CVBS signals, respectively. Details relating to the operation of the motion output module 112 and the CLD module 114 have been elaborated later in the specification.

Based on the inputs from the motion output module 112 and the CLD module 114, the adaptive TCC module 110 is configured to select a variable gain of the filter gain module 108, which varies the time constant of the adaptive filter 102. In an example, smaller the variable gain, slower is the time constant and accordingly, the rate of transition from the 2D and the 3D filter 118 is slow.

Once the motion detector 106 determines the presence of motion, a transition between the 2D and the 3D filter 118 is made in accordance with the rate of transition determined by the adaptive TCC module 110 and the separation of the chroma and the luma signals is performed by a chroma-luma separation module. The chroma-luma separation module is hereafter referred to as the Y/C separation module 116, where Y and C symbolically represent luma and chroma signals, respectively. Specifically, the separation of the chroma and the luma signals is performed by the 2D and the 3D filters included in the Y/C separation module 116.

Figure 2A:
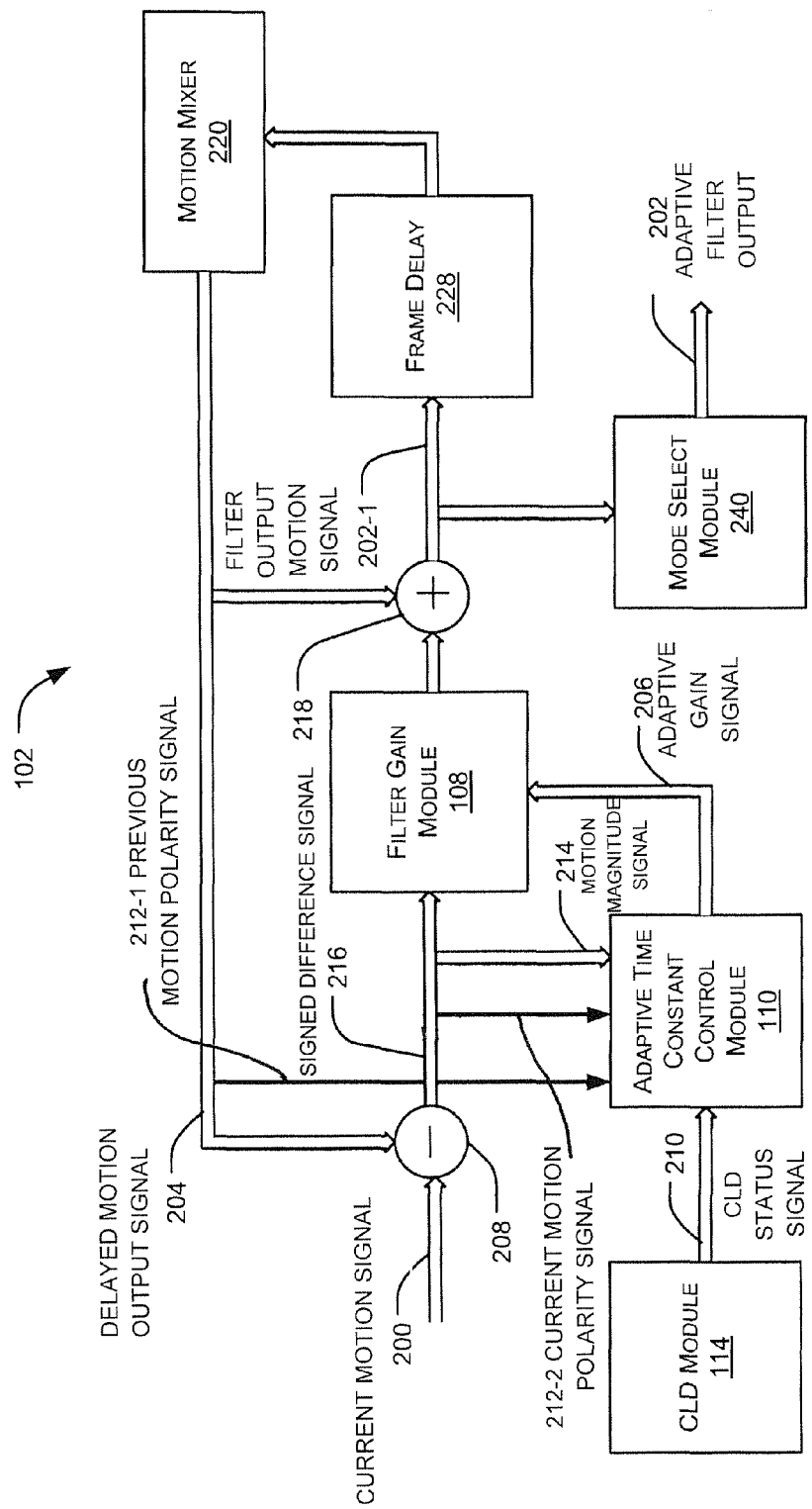
FIGS. 2a and 2b show an exemplary adaptive temporal motion filter, according to an embodiment of the present subject matter.
Figure 2B:
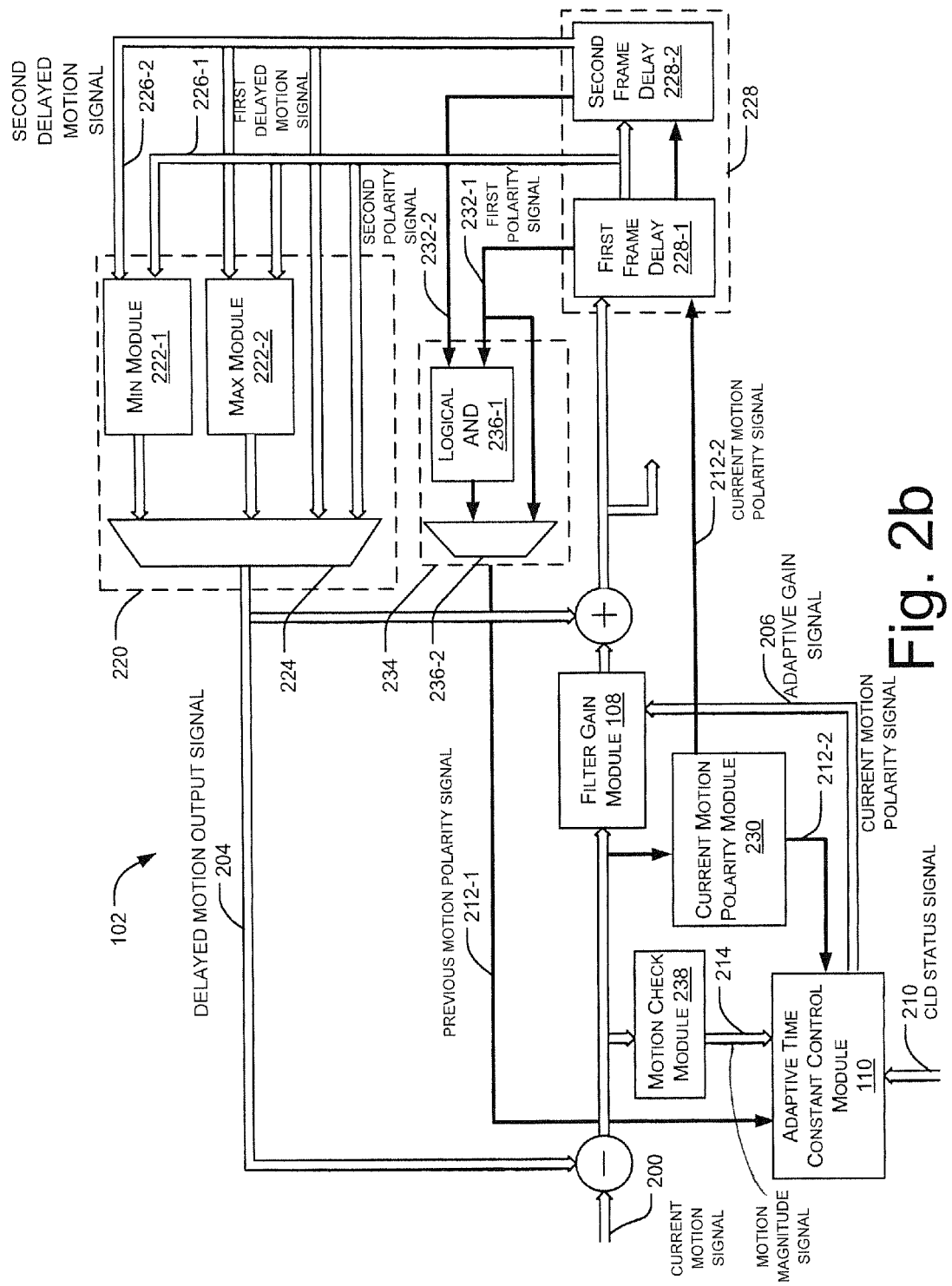

FIGS. 2a and 2b show adaptive filter 102, according to an embodiment of the present subject matter. The adaptive filter 102 may operate in an IIR, a max or a bypass mode. In the adaptive IIR mode, as aforementioned, the time constant of the adaptive filter 102 is varied based on the motion magnitude, the motion polarity, and the chroma-luma status of a pixel of the current motion. The current motion, hereinafter referred to as the current motion signal 200, is generated by the generated by the motion detector 106 based on the current and delayed CVBS signals. In the bypass mode, the current motion signal 200 is bypassed to an output of the adaptive filter 102. The output of the adaptive filter 102 may be referred to as the adaptive filter output 202. In the max mode, the adaptive filter output 202 is the maximum of the current motion signal 200, a one frame delayed motion output and a two frame delayed motion output and the delayed motion obtained by delaying the filter output motion generated by the adaptive filter 102. The delayed motion is hereinafter referred to as the delayed motion output signal 204 while the filter output motion is, hereinafter referred to as filter output motion signal 202-1.

Thus the adaptive filter output 202 depends on the mode of operation of the adaptive filter 102 and is obtained from a mode select module 240. The mode select module 240 has been elaborated later in the specification. As aforementioned, in the IIR mode, the adaptive filter output 202 is equal to the filter output motion signal 202-1. When configured in the adaptive IIR mode, the adaptive filter 102 operates as a first order temporal filter implemented as shown in equation 1:

$$\text{Current Output} = (\text{Current Input} \times K) + (\text{Previous Output} \times (1-K)) \quad (1)$$

wherein, current output is the filter output motion signal 202-1; current input is the current motion signal 200; previous output is the delayed motion output signal 204 and K is a gain factor that varies the time constant of the adaptive filter 102.

As mentioned before, the gain factor (K) is the variable gain of the filter gain module and is selected based on an adaptive gain signal 206 generated by the adaptive TCC module 110. Specifically, the adaptive TCC module 110 receives four inputs: a CLD status signal 210, a previous motion polarity signal 212-1, a current motion polarity signal 212-2, and a motion magnitude signal 214 to generate the adaptive gain signal 206. It may be mentioned that although in the said embodiment the adaptive TCC module 110 generates the adaptive gain signal 206 based on the four inputs, other implementations of the adaptive TCC module 110 where the generation of the adaptive gain signal 206 is based on any one or more inputs selected in any combination, out of the four inputs, are also possible.

In one example, the CLD status signal 210 is a 4-bit signal while the motion polarity signals 212-1 and 212-2 are one-bit signals each. Further, the current motion signal 200 and the delayed motion output signal 204 are 5-bit signals.

In operation, the current motion signal 200 and the delayed motion output signal 204 are subtracted in a comparator 208 to generate a signed difference signal 216. The signed difference signal 216 is a 6-bit signal where the additional one bit carries the sign of the signed difference signal 216. The signed difference signal 216 is fed to the filter gain module 108 where the signed difference signal 216 is multiplied with the gain factor (K). Thereupon, this multiplied signal is added to the delayed motion output signal 204 in an adder 218 to generate the filter output motion signal 202-1.

The delayed motion output signal 204 fed to the comparator 208 and the adder 218 is obtained from a motion mixer 220. The motion mixer 220 is explained in detail with respect to FIG. 2b. The motion mixer 220 includes a minimum (MIN) module 222-1, a maximum (MAX) module 222-2, and a motion selector multiplexer (MUX) 224. The MIN module 222-1 and the MAX module 222-2, each receive the one frame delayed motion output and a two frame delayed motion output. The one and two frame delayed motion output hereinafter referred to as a one frame delayed motion output signal 226-1 and a two frame delayed motion output signal 226-2, respectively. For the purpose of generation of the frame delayed motion output signals 226-1 and 226-2, a frame delay 228 is included in the adaptive filter 102. In one implementation, the frame delay 228 includes memory components, namely, a first frame delay 228-1 and a second frame delay 228-2, which store the filter output motion signal 202-1 to generate the first and the second delayed motion output signals 226-1 and 226-2, respectively.

In said implementation, the motion mixer 220 is programmable and may be configured to output the one frame delayed motion output signal 226-1, the two frame delayed motion output signal 226-2, a minimum signal of the two signals (226-1 and 226-2), or a maximum signal of the two signals (226-1 and 226-2). The minimum and the maximum signals are obtained from the MIN module 222-1 and the MAX module 222-2, respectively. The motion selector MUX 224 receives the minimum and the maximum signals as well as the one and the two frame delayed motion output signals (226-1 and 226-2) and selects one amongst them to generate the output of the motion mixer 220, which evidently is the delayed motion output signal 204.

Apart from the motion mixer 220 that generates the delayed motion output signal 204, also depicted in FIG. 2b are the various modules, which provide the previous motion polarity signal 212-1, the current motion polarity signal 212-2, and the motion magnitude signal 214 to the adaptive TCC module 110.

In one implementation, a current motion polarity module 230 generates the current motion polarity signal 212-2 signal based on a comparison of the current motion signal 200 and the delayed motion output signal 204. In one example, the current motion polarity signal 212-2 is determined based on the signed difference signal 216.

The current motion polarity signal 212-2, indicating the polarity of the current motion signal 200, is stored in the first frame delay 228-1 and the second frame delay 228-2 to generate a first and a second polarity signals 232-1 and 232-2, respectively. The first and the second polarity signals 232-1 and 232-2 indicate the polarity of the first and the second delayed motion output signals 226-1 and 226-2, respectively, and are used by a previous motion polarity module 234 to generate the previous motion polarity signal 212-1.

Specifically, the previous motion polarity signal 212-1 may either be the first polarity signal 232-1 or a logical AND of the first and the second polarity signals 232-1 and 232-2 based on the configuration of the previous motion polarity module 234. In one implementation, the previous motion polarity module 234 includes a logical AND module 236-1 to execute the logical AND of the first and the second polarity signals 232-1 and 232-2. The previous motion polarity module 234 also includes a polarity selector MUX 236-2 that selects either the first polarity signal 232-1 or the output of the logical AND module 236-1 depending on its configuration.

In one example, the current motion polarity signal 212-2 and the previous motion polarity signal 212-1 are one-bit signals and are provided to the adaptive TCC module 110 along with the motion magnitude signal 214.

In one embodiment, the motion magnitude signal 214 is generated by a motion check module 238. For example, the motion magnitude signal 214 may be a one-bit signal generated based on the comparison of the magnitude of the signed difference signal 216 with a preset threshold value. In said embodiment, an absolute value of the signed difference signal 216 is used for the comparison. Based on the comparison, the motion magnitude signal 214 may be a high logic bit if the magnitude of the signed difference signal 216 is greater than the threshold value.

The foregoing description elaborates the generation of motion magnitude and motion polarity information mentioned with respect to the motion output module 112 described in FIG. 1. As will be apparent, the current motion polarity module 230, the previous motion polarity module 234 and, the motion check module 238 together comprise the motion output module 112. Thus, three out of the four inputs to the adaptive TCC module 110, namely, the current and previous motion polarity signals 212-2 and 212-1 and the motion magnitude signal 214 are generated by the motion output module 112, while the fourth input, i.e., the CLD status signal 210 is obtained from the CLD module 114.

FIG. 3 depicts the CLD module 114 employed for the generation of the CLD status signal 210, in accordance with one aspect of the present subject matter. In one embodiment, the CLD module 114 is implemented within the adaptive filter 102, however, in various other embodiments, the CLD module 114 may be an independent module operationally coupled to the adaptive filter 102.

In one implementation, the CLD module 114 receives a current frame (f4) 300 selected from the current CVBS and up to 4 delayed frames from the delayed CVBS. A first delayed frame, namely, a first previous frame (f3) 302, is delayed by one frame with respect to the current frame (f4) 300. Similarly, a second previous frame (f2) 304 delayed by one frame with respect to the first previous frame (f3) 302 is received. Likewise a third previous frame (f1) 306, and fourth previous frame (f0) 308 are also received. It may be mentioned that the frames (f4) 300 to (f0) 308 are derived from the current and delayed CVBS signals. It may also be mentioned that the current and delayed CVBS signals are used by the motion detector 106 for the purposes of motion detection and are available for utilization by the CLD module 114. The current frame (f4) 300 and the previous frames 302 through 308 are individually received by CLD processors 310 through 318, respectively.

The CLD processors 310 through 318 are programmable filters configured to indicate the chroma-luma status, referred to as a CLD status, of every pixel in the current frame (f4) 300 and the previous frames 302 through 308, respectively. In other words, for example, the CLD processor 310 determines whether a pixel is a chroma pixel or a luma pixel, for the current frame (f4) 300 it receives.

In one example, the CLD processor 310 generates a 4-bit output to indicate whether the pixel is a chroma pixel or a luma pixel, where the 4-bit output 1111 indicates that the pixel is a chroma pixel, the 4-bit output 0000 indicates that the pixel is a luma pixel, and the other outputs indicate the various in-between transition stages.

The 4-bit output from each of the CLD processors 310 through 318 is received in a temporal CLD mixer 320. The temporal CLD mixer 320 is a programmable filter configured to perform a max or average function of the 4-bit output from one or more CLD processors selected from amongst the CLD processors 310 through 318 to generate the CLD status signal 210. The CLD status signal 210 may be a single bit or a multi-bit signal. In one example, the CLD status signal 210 is a 4-bit signal and is quantized to one bit before being provided as an input to the adaptive TCC module 110.

Figure 4:
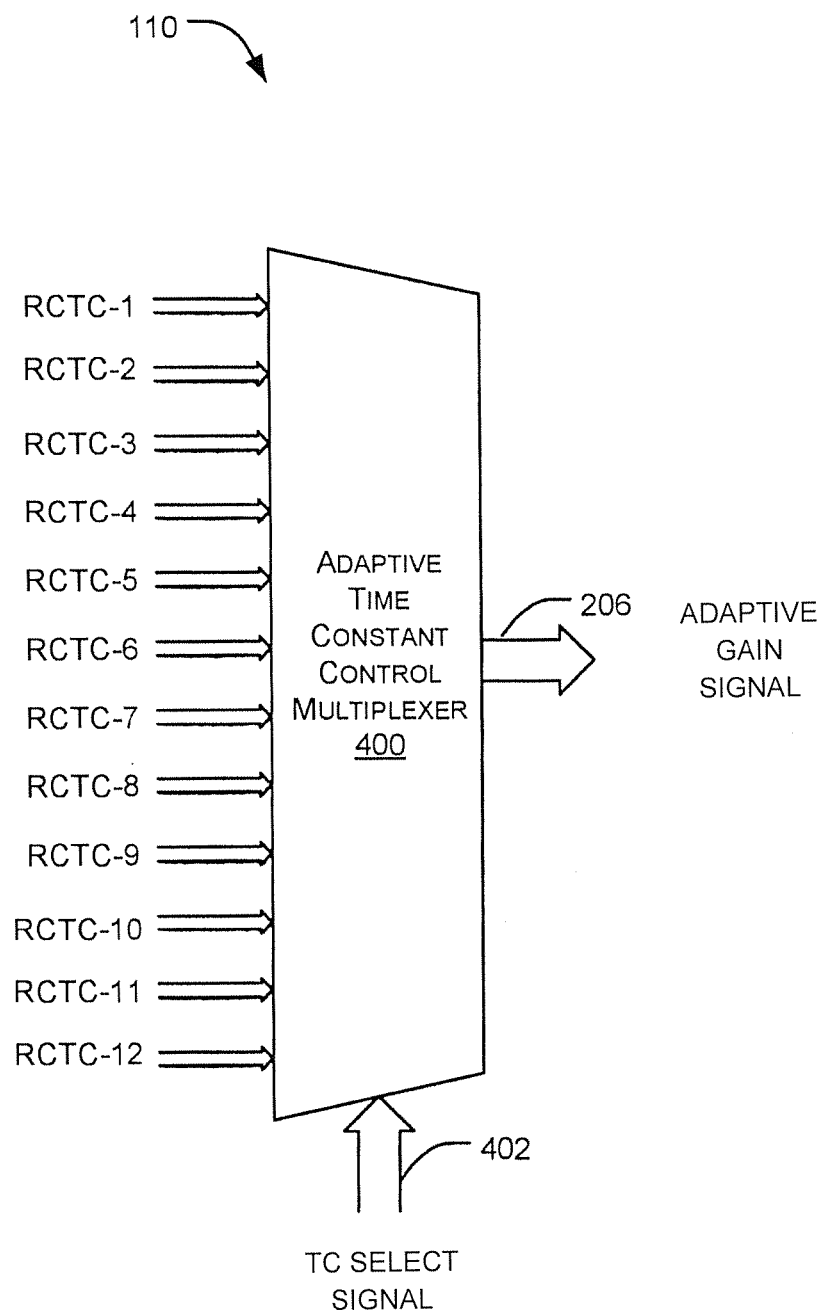
FIG. 4 illustrates an exemplary adaptive time constant control module, according to an embodiment of the present subject matter.

FIG. 4 illustrates the adaptive TCC module 110 according to an implementation of the present subject matter. The implementation depicted in FIG. 4 is only for illustrative purposes and should not be construed as limiting. Various other implementations and modifications of the TCC module 110 will be apparent to a person skilled in the art.

As mentioned before, the adaptive TCC module 110 receives four single bit signals, i.e., the CLD status signal 210, the previous motion polarity signal 212-1, the current motion polarity signal 212-2, and the motion magnitude signal 214, which generate the adaptive gain signal 206 that varies the gain factor (K) of the gain module 108.

In one embodiment, the adaptive TCC module 110 includes a multiplexer, herein referred to as an adaptive TCC mux 400 and receives a 4-bit control signal which is a concatenation of the four single bit signals. The 4-bit control signal, referred to as the TC select signal 402, acts as a select enable signal for the adaptive TCC mux 400.

Further, a plurality of user defined registers are associated with the adaptive TCC mux 400. In one example, 12 user defined registers are associated with the adaptive TCC mux 400. Based on the TC select signal 402, one amongst the 12 user defined registers, herein referred to as RCTC1 to RCTC12, is selected.

For example, the following selection may be made:
if the 4 bits of the TC select signal 402 are 0000, RCTC1 is selected;
if the 4 bits of the TC select signal 402 are 0001, RCTC1 is selected;
if the 4 bits of the TC select signal 402 are 0010, RCTC2 is selected;
if the 4 bits of the TC select signal 402 are 0011, RCTC3 is selected;
if the 4 bits of the TC select signal 402 are 0100, RCTC4 is selected;
if the 4 bits of the TC select signal 402 are 0101, RCTC4 is selected;
if the 4 bits of the TC select signal 402 are 0110, RCTC5 is selected;
if the 4 bits of the TC select signal 402 are 0111, RCTC6 is selected;
if the 4 bits of the TC select signal 402 are 1000, RCTC7 is selected;
if the 4 bits of the TC select signal 402 are 1001, RCTC7 is selected;
if the 4 bits of the TC select signal 402 are 1010, RCTC8 is selected;
if the 4 bits of the TC select signal 402 are 1011, RCTC9 is selected;
if the 4 bits of the TC select signal 402 are 1100, RCTC10 is selected;
if the 4 bits of the TC select signal 402 are 1101, RCTC10 is selected;
if the 4 bits of the TC select signal 402 are 1110, RCTC11 is selected; and
if the 4 bits of the TC select signal 402 are 1111, RCTC12 is selected;

In various other implementations of the adaptive TCC module 110, where the generation of the adaptive gain signal 206 is based on any number of inputs selected from amongst the CLD status signal 210, the previous motion polarity signal 212-1, the current motion polarity signal 212-2 and the motion magnitude signal 214, the configuration of the adaptive TCC mux 400 and the number of associated user defined registers may vary according to the selection of inputs.

Each user defined register RCTC1 to RCTC12 is configured to store a gain/mode signal and provide the same to the adaptive TCC mux 400 upon the selection of the user defined registers. In one embodiment, each user defined register RCTC1 to RCTC12 is a 3-bit register and holds a 3 bit gain/mode signal. The 3-bit gain/mode signal may either be the gain factor (K) that varies the time constant of the adaptive filter 102 or be indicative of the max mode or the bypass mode.

In one illustration, the various 3 bit gain/mode signal may be as follows:
3 bit gain/mode signal 000 may indicate a gain factor of 0.5;
3 bit gain/mode signal 001 may indicate a gain factor of 0.25;
3 bit gain/mode signal 010 may indicate a gain factor of 0.125;
3 bit gain/mode signal 011 may indicate a gain factor of 0.0625;
3 bit gain/mode signal 100 may indicate a gain factor of 0.75;
3 bit gain/mode signal 101 may indicate a gain factor 0.875;
3 bit gain/mode signal 110 may indicate the initiation of the max mode; and
3 bit gain/mode signal 111 may indicate the initiation of the bypass mode.

Consider, for example, that the RCTC3 is selected based on the combination 0011 of the 4 bits of the TC select signal 402. Accordingly, the 3 bit gain/mode signal stored in the RCTC 3, say 001 indicating the gain factor of 0.25, becomes the output of the adaptive TCC mux 400. The output of the adaptive TCC mux 400 is equivalent to the adaptive gain signal 206. In another example, if the 3 bit gain-mode signal stored in the RCTC 3 indicates the bypass mode or the max mode, a bypass mode enable signal (shown in FIG. 5) or a max mode enable signal (shown in FIG. 5) is output instead of the adaptive gain signal 206.

In one embodiment, a single bit mode control signal (not shown in Figs.) may act as the bypass mode enable signal as well as the max mode enable signal. For example, when the mode control signal is at a logical high, the bypass mode is enabled. While the max mode is enabled when the mode control signal is at a logical low.

Figure 5:
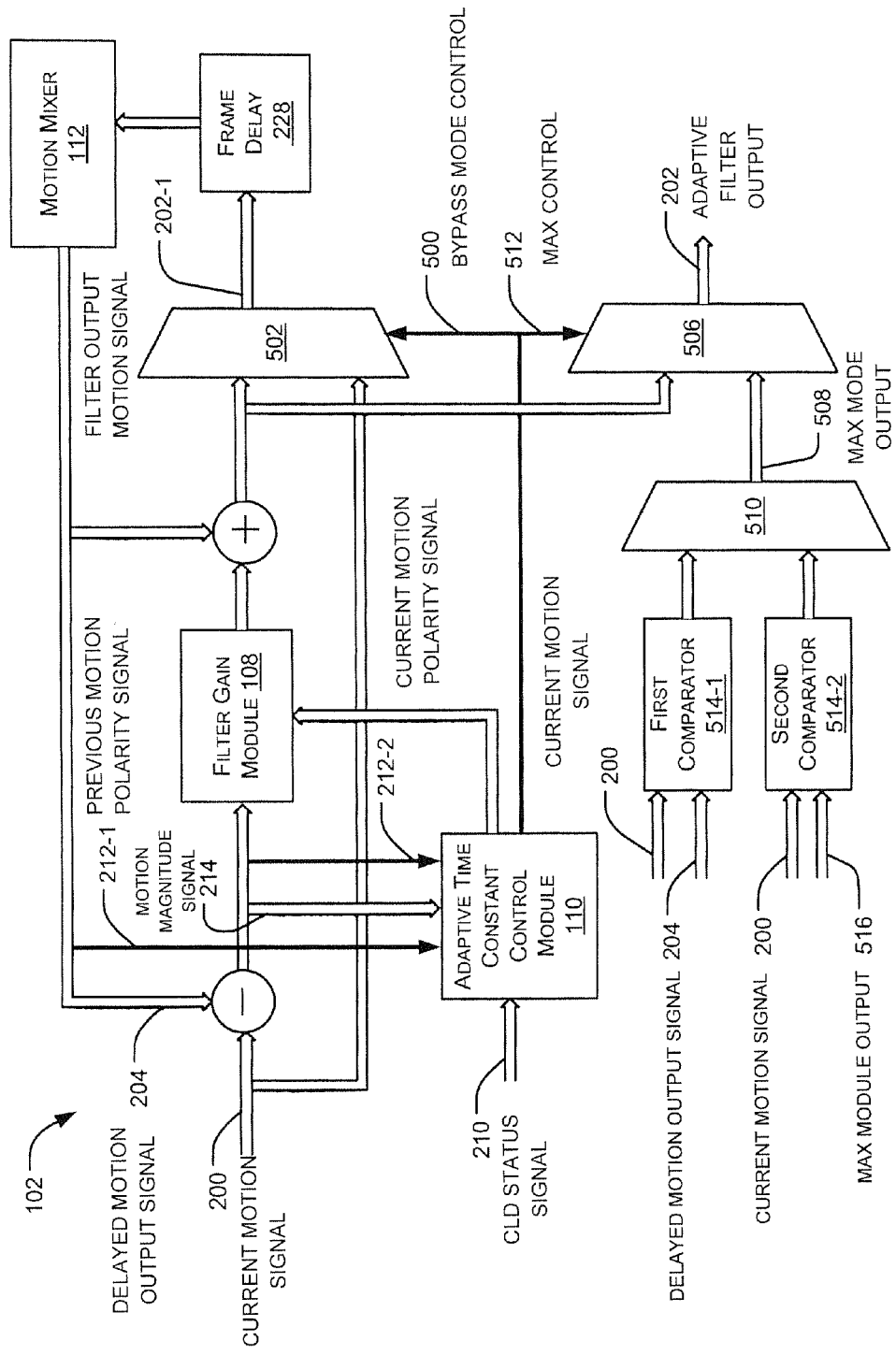
FIG. 5 shows an exemplary implementation of the adaptive temporal motion filter to depict the various modes of operation thereof, in accordance with an embodiment of the invention.

The operation of the adaptive filter 102 in the bypass mode and the max mode is illustrated with respect to FIG. 5.

When the bypass mode enable signal, hereinafter referred to as the bypass mode control 500, is generated by the adaptive TCC module 110, the adaptive filter 102 operates in the bypass mode. Specifically, the adaptive TCC module 110 communicates the bypass mode control 500 to a first mux 502. The first mux 502 is configured to output the current motion signal 200 upon receipt of the bypass mode control 500. In one embodiment, an adaptive gain signal 206 indicating a unity gain may enable the bypass mode. In such an embodiment, the adaptive gain signal 206 having the unity gain acts as the bypass mode enable signal. Accordingly, the output of the first mux 502 is the current motion signal 200 upon receipt of the adaptive gain signal 206 having unity gain. When the first mux 502 is not enabled by the bypass mode control 500, the output of the first mux 502 is the filter output motion 202-1.

A second mux 506, associated with the first mux 502, receives the filter output motion 202-1 as well as a max mode output 508 from a third output mux 510. The max mode enable signal, hereinafter referred to as the max control 512, acts as a select signal for the second mux 506. When the second mux 506 receives the max control 512, the second mux 506 is enabled to output the max mode output 508.

The max mode output 508, provided by the third output mux 510, is the maximum of the current motion signal 200, the one frame delayed motion output signal 226-1, or the two frame delayed motion output signal 226-2 based on the configuration of the adaptive filter 102. In one implementation, a first and a second comparators 514-1 and 514-2 are coupled the third mux 510 to generate the max mode output 508.

The first comparator 514-1 compares the current motion signal 200 and the delayed motion output signal 204 to determine the greater of the two. Similarly, the second comparator 514-2 compares the current motion signal 200 and a max module output 516 to select the maximum of the two. The max module output 516 is the maximum of the one frame delayed motion output signal 226-1 and the two frame delayed motion output signal 226-2. In one example, the max module output 516 is the output of the MAX module 222-2. The third mux 510 receives the outputs of the first and the second comparators 514-1 and 514-2 and is configured to select the any one of the two as the max mode output 508. The selected max mode output 508 is provided to the second mux 506.

As may be apparent, the output of the second mux 506 is the adaptive filter output 202. Accordingly, the adaptive filter output 202 may be the max mode output 508 or the filter output motion signal 202-1 based on the adaptive gain signal 206 or the current motion signal 200.

The first, second and third mux (502, 506 and 510) along with the first and the second comparators 514-1 and 514-2 comprise the aforementioned mode select module 240. In operation, when the filter output motion signal 202-1 is the adaptive filter output 202, the time constant, which determines the rate of transition between the 2D filtering and 3D filtering is varied, as explained earlier.

Figure 6A:
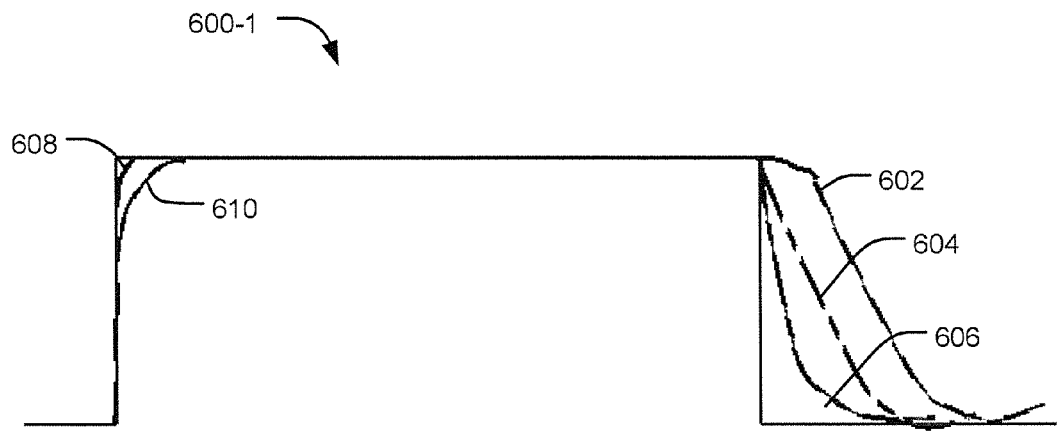
FIGS. 6a and 6b illustrate an exemplary waveform to depict various time responses of a filter gain module of the adaptive temporal motion filter, in accordance with an embodiment of the present subject matter.
Figure 6B:
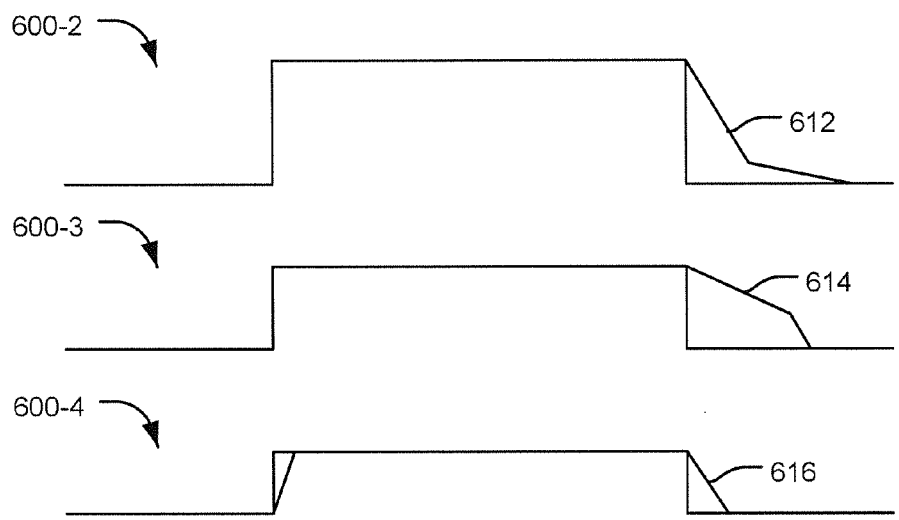

FIGS. 6a and 6b show waveforms to depict the various rate of transition between the 2D filtering and 3D filtering, in accordance with an embodiment of the present subject matter.

FIG. 6a illustrates a waveform 600-1 showing a first transition curve 602, a second transition curve 604, and a third transition curve 606, which depict the rate of transition from the 2D filter 120 to the 3D filter. Also shown are fourth and a fifth transition curves 608 and 610 that depict the rate of transition from the 3D filter 118 to the 2D filter.

As depicted, the transition from the 2D filter 120 to the 3D filter 118 happens gradually as compared to the transition from the 3D filter 118 to the 2D filter. In addition, the transition from the 2D filter 120 to the 3D filter 118 may be at varied rates. The gradual transition at varied rates enables adaptive soft switching. As described in the foregoing description, adaptive soft switching allows reduction in occurrence of switching artifacts with reduced motion artifacts.

FIG. 6b illustrates three waveforms 600-2, 600-3 and 600-4. The waveforms 600-2, 600-3 and 600-4 show a fifth, a sixth, and a seventh transition curves 612, 614 and 616, respectively. The transition curves 612, 614 and 616 illustrate the dependence of the rate of transition on the difference in magnitude between the current motion signal 200 and the delayed motion output signal 204, or more specifically, the dependence of the rate of transition on the motion magnitude signal 214 generated by a motion check module 238. It may be recalled that the motion magnitude signal 214 is a result of comparison between the magnitude of the signed difference signal 216 with a preset threshold value.

As seen from the waveforms 600-2 and 600-3, the fifth and the sixth transition curves 612 and 614 are non-linear. Thus, when the result of comparison between the signed difference signal 216 and the preset threshold value is high, the transition from the 2D to the 3D filter 118 may be non-linear. On the other hand, if the result of the comparison is low, the transition from the 2D to the 3D filter 118 may be linear as depicted by the seventh transition curve 616.

Figure 7:
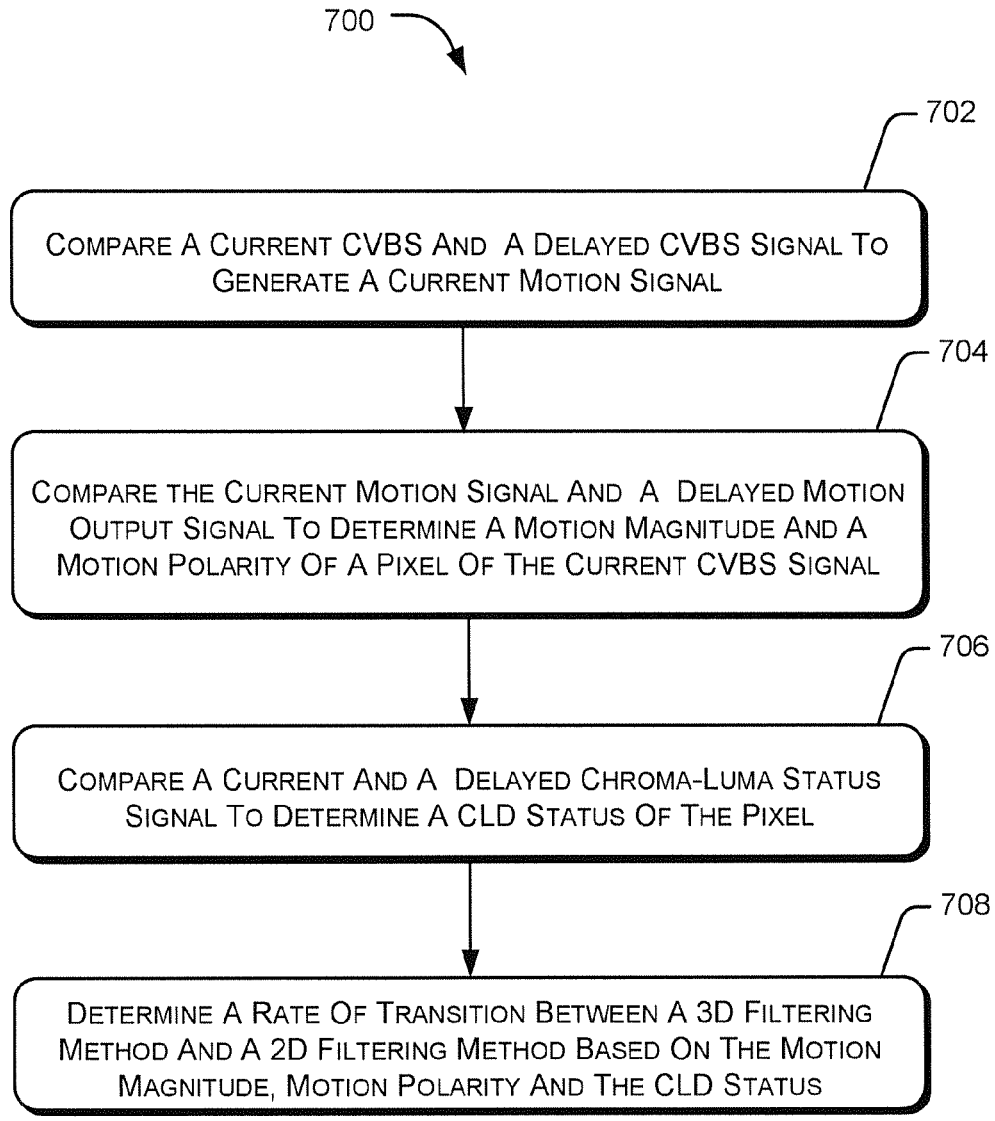
FIG. 7 is a flowchart depicting a method of processing of a composite video signal, according to an embodiment of the present subject matter.

FIG. 7 is a flowchart that depicts an exemplary method 700 video signal processing, according to an embodiment of the present subject matter. The exemplary method may be described in the general context of a composite video signal decoder. The exemplary method may be described in the general context of analog and digital circuit elements. However, it will be noted that the method is also implementable through computer executable instructions.

In accordance with one embodiment of the present subject matter, the method 700 may be implemented in the previously described video decoder system 100. However, it will be appreciated by one skilled in the art that such an implementation is not limiting. The method 700 may be implemented in a variety of video signal processing systems.

The method 700 is initiated at block 702 where a comparison of a current CVBS and a delayed CVBS takes place to generate a current motion signal. In one example, the comparison may be performed by a motion detection block, such as, the aforementioned motion detector 106. The delayed CVBS is typically generated by storing the current CVBS in a video signal memory, such as the frame memory 104.

The current motion signal is indicative of presence of motion in a current image signal contained in the current CVBS with respect to a previous image signal contained in the delayed CVBS. In one example, based on a motion value of the current motion signal one of a 2D filtering method or a 3D filtering method is selected for decoding a pixel of the current image signal. If the motion value indicates that motion is present, 2D filtering method is used to decode the pixel. On the other hand, the 3D filtering method may be used if motion is absent.

At block 704 a comparison of the current motion signal and a delayed motion output signal is carried out to determine a motion magnitude and motion polarity of the pixel. The motion polarity may be based on the polarity of the current motion signal and the delayed motion output signal.

The delayed motion output signal is obtained by delaying a filter motion output obtained from an adaptive filter, such as the filter output motion signal 202-1 generated by the adaptive filter 102 in the IIR mode. The filter motion output is delayed by storing the filter motion output in frame delay components, such as, frame delay 228. In one example, the delayed motion output signal may be delayed by one frame or two frames. In another example the delayed motion signal may either be a maximum of the one frame or two frames delayed signal or a minimum of the two.

At block 706, a comparison of current chroma-luma status signals and delayed chroma-luma status signals is performed to determine a CLD status of the pixel. In one implementation, temporal filtering of the current chroma-luma status signals and delayed chroma-luma status signals is performed to determine the CLD status of the pixel. The current chroma-luma status signals and the delayed chroma-luma status signals indicate the chroma-luma status of a plurality of pixels of the current CVBS and the delayed CVBS. The current chroma-luma status signals and the delayed chroma-luma status signals are derived from current CVBS and the delayed CVBS, respectively.

At block 708, a rate of transition between the 2D filtering method and the 3D filtering method is determined based on one or more of the motion magnitude, the motion polarity and, the chroma-luma status of the pixel. The rate of transition indicates a fast or a slow switching between a 2D filter and a 3D filter, which are configured to perform 2D filtering and 3D filtering, respectively, to decode a pixel of the current CVBS. In one example, the rate of transition may be controlled by the adaptive TCC module 110 based on the motion magnitude, the motion polarity and, the chroma-luma status of the pixel.

The rate of switching for a combination of one or more of the motion magnitude, the motion polarity and the chroma-luma status may be predefined based on an end application of a video signal processing system. This enables prevention of switching artifacts and adaptive soft switching in a video decoding process.

Additionally, based on one or more of the motion magnitude, the motion polarity, and the chroma-luma status of the pixel a max output or a bypass output may be generated. Specifically, the max output is the maximum of the current motion signal and the delayed motion output signal while the bypass output is the current motion signal. Automatic selection of an output from amongst the filter motion output, max output and bypass output is enabled to facilitate elimination of occurrences of motion artifacts in the video signal processing.

The order in which the method 700 is described is not intended to be construed as a limitation, and any number of the described method blocks can be combined in any order to implement the method, or an alternate method. Additionally, individual blocks may be deleted from the method without departing from the spirit and scope of the subject matter described herein.

Furthermore, the method can be implemented in any suitable hardware, software, firmware, or combination thereof. Specifically, the implementation may be in any video processing logic that involves switching between the spatial and temporal processing.

Although embodiments a video decoder system and the adaptive temporal motion filter have been described in language specific to structural features and/or methods, it is to be understood that the appended claims are not necessarily limited to the specific features or methods described. Rather, the specific features and methods are disclosed as exemplary implementations for the video decoder system and the adaptive temporal motion filter.

I claim:

1. A video decoder system, comprising:
   a motion detector configured to determine presence of motion in a current composite video signal by comparing the current composite video signal with a corresponding delayed composite video signal;
   a chroma-luma (Y/C) separation module configured to decode a pixel based on the presence of motion, using at least a filter selected from a 2D filter and a 3D filter; and
   an adaptive temporal motion filter configured to adaptively select a rate of switching between the 2D filter and the 3D filter, the adaptive temporal motion filter having a time constant that is varied by selectively changing a gain factor of the adaptive temporal motion filter based at least in part on a motion magnitude, a motion polarity, and a chroma-luma status of the pixel;
   wherein the adaptive temporal motion filter is further configured to automatically switch modes between infinite impulse response mode, a max mode, and a bypass mode based at least in part on the motion magnitude, the motion polarity, and the chroma-luma status of the pixel.

2. The video decoder system as claimed in claim 1, wherein, when in the bypass mode, the adaptive motion filter passes signals through without performing filtering.

3. The video decoder system as claimed in claim 1, wherein, when in the max mode, the adaptive motion filter outputs a maximum of a current motion signal, a one frame delayed motion output from the adaptive motion filter, and a two frame delayed motion output from the adaptive motion filter.

4. The video decoder system as claimed in claim 1, wherein the motion detector is configured to determine the motion magnitude and the motion polarity of the pixels by comparing a current motion and a delayed motion; and wherein the current motion is based upon the current composite video signal and the delayed composite video signal; and wherein the delayed motion is based upon an output of the adaptive temporal motion filter.

5. The video decoder system as claimed in claim 1, wherein the chroma-luma separation module is configured to determine the chroma-luma status of the pixel by performing temporal filtering using current and a delayed chroma-luma status signals that are derived from the current composite video signal and delayed composite video signal, respectively.

6. The video decoder system as claimed in claim 1, wherein the adaptive temporal motion filter adaptively selects the rate of switching between the 2D filter and the 3D filter by adaptively selecting a rate of switching from the 2D filter to the 3D filter and adaptively selecting a rate of switching from the 3D filter to the 2D filter, with the rate of switching from the 2D filter to the 3D filter being slower than the rate of switching from the 3D filter to the 2D filter.

7. A video decoder system, comprising:
   a motion detector configured to determine presence of motion in a current composite video signal by comparing the current composite video signal with a corresponding delayed composite video signal;
   a chroma-luma (Y/C) separation module configured to decode a pixel based on the presence of motion, using at least a filter selected from a 2D filter and a 3D filter; and
   an adaptive temporal motion filter configured to adaptively select a rate of switching between the 2D filter and the 3D filter based at least in part on a motion magnitude, a motion polarity, and a chroma-luma status of the pixel;
   wherein the adaptive temporal motion filter is configured to automatically switch modes between infinite impulse response mode, a max mode, and a bypass mode based at least in part on the motion magnitude, the motion polarity, and the chroma-luma status of the pixel.

8. The video decoder system as claimed in claim 7, wherein, when in the bypass mode, the adaptive motion filter passes signals through without performing filtering.

9. The video decoder system as claimed in claim 7, wherein, when in the max mode, the adaptive motion filter outputs a maximum of a current motion signal, a one frame delayed motion output from the adaptive motion filter, and a two frame delayed motion output from the adaptive motion filter.

10. The video decoder system as claimed in claim 7, wherein the adaptive temporal motion filter adaptively selects the rate of switching between the 2D filter and the 3D filter by adaptively selecting a rate of switching from the 2D filter to the 3D filter and adaptively selecting a rate of switching from the 3D filter to the 2D filter, with the rate of switching from the 2D filter to the 3D filter being slower than the rate of switching from the 3D filter to the 2D filter.

11. A method, comprising:
    determining presence of motion in a current composite video signal by comparing a current composite video signal with a corresponding delayed composite video signal;
    decoding a pixel based on the presence of motion, using a filter mode selected from an infinite impulse response mode, a max mode, and a bypass mode;
    adaptively selecting a rate of switching between the infinite impulse response mode, the max mode, and the bypass mode based at least in part on a motion magnitude, a motion polarity, and a chroma-luma status of the pixel.

12. The method of claim 11, wherein, when in the bypass mode, the filter mode passes signals without performing filtering.

13. The method of claim 11, wherein, when in the max mode, the filter mode outputs a maximum of a current motion signal, a one frame delayed motion output from the adaptive motion filter, and a two frame delayed motion output.

14. A video decoder system, comprising:
    a motion detector configured to determine presence of motion in a current composite video signal by comparing the current composite video signal with a corresponding delayed composite video signal;
    a chroma-luma (Y/C) separation module configured to decode a pixel based on the presence of motion, using at least a filter selected from a 2D filter and a 3D filter; and an adaptive temporal motion filter configured to adaptively select a rate of switching between the 2D filter and the 3D filter based at least in part on a motion magnitude, a motion polarity, and a chroma-luma status of the pixel;
wherein the adaptive temporal motion filter is further configured to automatically switch modes between infinite impulse response mode, a max mode, and a bypass mode based at least in part on the motion magnitude, the motion polarity, and the chroma-luma status of the pixel.

15. The video decoder system as claimed in claim 14, wherein, when in the bypass mode, the adaptive motion filter passes signals through without performing filtering.

16. The video decoder system as claimed in claim 14, wherein, when in the max mode, the adaptive motion filter outputs a maximum of a current motion signal, a one frame delayed motion output from the adaptive motion filter, and a two frame delayed motion output from the adaptive motion filter.

17. The video decoder system as claimed in claim 14, wherein the motion detector is configured to determine the motion magnitude and the motion polarity of the pixels by comparing a current motion and a delayed motion; and wherein the current motion is based upon the current composite video signal and the delayed composite video signal; and wherein the delayed motion is based upon an output of the adaptive temporal motion filter.

* * * * *